(12) United States Patent
Zahoransky et al.

(10) Patent No.: US 6,776,600 B1
(45) Date of Patent: Aug. 17, 2004

(54) INJECTION MOLDING MACHINE FOR PRODUCING INJECTION-MOLDED ARTICLES

(75) Inventors: Ulrich Zahoransky, Freiburg (DE); Alexander Senn, Freiburg (DE); Jobst Ulrich Gellert, Georgetown (CA); Simon Chu, Georgetown (CA)

(73) Assignees: Anton Zahoransky GmbH & Co. (DE); Mold-Masters Limited (CA)

( * ) Notice: Subject to any disclaimer, the term of this patent is extended or adjusted under 35 U.S.C. 154(b) by 0 days.

(21) Appl. No.: 09/869,676

(22) PCT Filed: Dec. 30, 1998

(86) PCT No.: PCT/EP98/08509

§ 371 (c)(1),
(2), (4) Date: Jun. 29, 2001

(87) PCT Pub. No.: WO00/40389

PCT Pub. Date: Jul. 13, 2000

(51) Int. Cl.$^7$ ................................. B29C 45/16

(52) U.S. Cl. ....................... 425/130; 425/572

(58) Field of Search ................. 425/130, 572, 425/588

(56) References Cited

U.S. PATENT DOCUMENTS

| | | | |
|---|---|---|---|
| 2,418,856 A | * | 4/1947 | Stacy ........................ 425/130 |
| 3,817,675 A | | 6/1974 | Maiocco |
| 4,135,870 A | | 1/1979 | Wallace et al. |
| 5,256,048 A | | 10/1993 | Jacobs et al. |
| 5,262,119 A | | 11/1993 | Smith |
| 5,609,890 A | * | 3/1997 | Boucherie .................. 425/130 |
| 5,656,215 A | | 8/1997 | Eckardt et al. |
| 5,989,009 A | | 11/1999 | Gray et al. |

FOREIGN PATENT DOCUMENTS

| | | |
|---|---|---|
| DE | 2121033 | 11/1972 |
| DE | 2223659 | 12/1972 |
| DE | 2363503 | 7/1975 |
| DE | 2461925 | 11/1975 |
| DE | 2609854 | 9/1977 |
| DE | 2814462 | 12/1978 |
| DE | 3342049 A1 | 5/1985 |
| DE | 3609556 C1 | 10/1987 |
| DE | 91035538 U1 | 8/1991 |
| DE | 3424681 C2 | 6/1992 |
| DE | 4140787 C1 | 3/1993 |
| DE | 4314941 C2 | 11/1994 |
| DE | 4414258 C2 | 7/1996 |
| DE | 19515294 A1 | 10/1996 |
| DE | 296226660 U1 | 5/1997 |
| DE | 19722366 A1 | 12/1998 |
| DE | 19728733 A1 | 1/1999 |
| DE | 19857053 A1 | 6/2000 |
| EP | 0623445 B1 | 11/1994 |
| GB | 1586010 | 4/1978 |
| JP | 01038217 | 2/1989 |
| JP | 05301254 | 11/1993 |
| JP | 10006363 | 1/1998 |
| WO | 8800675 | 12/1988 |

\* cited by examiner

*Primary Examiner*—Tim Heitbrink
(74) *Attorney, Agent, or Firm*—Sterne, Kessler, Goldstein & Fox P.L.L.C.

(57) ABSTRACT

An injection molding machine for the manufacture of injection molded items, especially toothbrush bodies or toothbrushes, wherein the injection molding machine includes a mold-containing injection die (1) and an injection unit (2), especially with a screw-piston extruder or a similar material transport system. Distribution or transport channels lead from the injection unit (2) forming a distribution channel arrangement (4) to the individual mold cavities (5). One or more feeds (10) are located on the distribution channels and/or the mold cavities for at least one additive, for instance, a liquid color.

32 Claims, 8 Drawing Sheets

INJECTION MOLDING MACHINE FOR PRODUCING INJECTION-MOLDED ARTICLES

BACKGROUND

The invention relates to a process for the manufacture of injection-molded articles, especially toothbrush bodies or toothbrushes, wherein the molding material is conveyed from a supply container by means of an injection unit, in particular a screw-piston extruder or a similar material delivery means to the mold cavities. Beyond this, the invention relates to an injection molding machine for the carrying out of this process.

Toothbrushes, particularly in regard to the toothbrush body, have been produced in a multiplicity of colors, generally limited to five different colors. Production in these colors could be executed by the installation of a corresponding number of injection molding machines. However, setting aside the extreme cost factor, such a measure had disadvantages, in that as a rule, different quantities for the toothbrush body lots for each color resulted in no uniform production quota for each machine. Instead, in practice, color changes were undertaken during the production of toothbrush bodies. This again proved to be a complicated matter, very time consuming and caused a poor result in production, which was seen as anything but trivial.

The various coloring substances were, in one method, mixed dry into the plastic granulate at hand for the toothbrush bodies, and this mixture was then heated in the screw-piston extruder, or a similar delivery system, then liquified and apportioned through a mold-entry and internal cavity connection system for distribution into the individual mold cavities or nests thereof, while the injection procedure was in action. In another method, liquid coloring material was employed, which if a screw-piston extruder was being used, was fed into the entry chamber thereof.

If a color change is to be made, then all traces of previous color must be purged from the screw extruder, as well as the delivery channels. This operation is carried out, so that the new color is brought into the system, without stopping the molding of toothbrush bodies until the last remnants of the previous color have been eradicated. This can take as much as an hour and the toothbrush bodies so made, form an unusable product, since they show both the old and the new coloring. Furthermore, an operator's attention is required to monitor the color change of an otherwise automatically running injection molding machine.

The ensuing costs for such a color change are so great, that this procedure is seldom followed as a matter of practice. On this account, toothbrush bodies of respectively one color are produced on an inventory basis. Where production exceeding the current production needs for toothbrush bodies of one color is concerned, large quantities of toothbrush bodies must therefore be placed in interim inventory, so that, for the subsequent insertion of the bristles, toothbrush bodies of all possible colors are made available in the desired color assortment ratios as called for. For this operation, a corresponding, dedicated area in the factory is necessary. It is also problematic that measures must be taken to avoid, that over a lengthy storage time, a contamination of the toothbrush bodies occurs. This is valid especially in the production of toothbrush bodies from the standpoint of hygienic demands.

In order to avoid this interim inventory storage, it is certainly possible to forward the produced toothbrush bodies immediately to the insertion of the bristles. However, then an even more circumstantial color sorting following either the insertion operation or the packing could be required.

SUMMARY OF THE INVENTION

Thus, the object of the present invention is to create a process, in which, according to immediate need, a change in production to a different variety, at least in regard to the coloring of the injection molded articles, can be carried out in a short time. Also the possibility should be realized, of simultaneously manufacturing different injection molded items with one injection molding machine. Finally, an injection molding machine for carrying out the process is to be provided.

For the achievement of this object, insofar as it concerns the process and in accordance with the invention for the manufacture of injection molded items, the molding material is to be combined with at least one additive which is fed into the distribution path of the molding material as this is being delivered to one or more mold cavities. The introduction of the additive is to be at a point in the direction of flow following the injection unit, behind its entry point, and the additive material and the molding material are to be mixed.

In this way, it becomes possible, with a single injection molding machine, to simultaneously produce different items of injection molding manufacture. This capability substantially reduces the cost and, in many applications, a changeover of the injection molding machine from one item to another becomes a matter of little time and trouble. The basic material issuing from the injection unit on its way to the single or grouped nests of molds receives one or more additives, so that, in accordance with each additive, different items can be simultaneously produced.

As an example, in the case of an injection molding die with, customarily, a multiplicity of mold cavities, it is possible, by the above described advantage, that toothbrush bodies differing in colors can be injection molded entirely on an as needed basis. Then in accordance with the required assortment, these bodies can be suitably color grouped as produced in the injection molding machine.

Additionally, in the case of a possibly foreseen changeover in the production of injection molded items to a different design, such items which may carry the previous additive are essentially smaller and hence a quicker changeover becomes possible. At least the screw-piston type extruder or similar delivery means operation, is isolated from that channel section which contains the additive, for instance coloring material, so the molding material found in the extruder need not purged. With each new position of the entry point of the color, or the like additive, within the transport path of the molding material as it approaches the mold cavities, the zone containing such additive or coloration is less and thereby, for an individual color change, the requirement for purging also is reduced. By means of mixing the molding material and the additive just after their being joined, the feed of the mix can be done even closer to the respective mold cavity.

If a multiplicity additive feed points are foreseen, it is possible that these can be conducted directly into the mold entry opening by means of one feed line. In this case, practically from injection cycle to injection cycle, a change of color could be undertaken, without the necessity of an intermediate purge procedure. Without additional measures for the thorough mixing of color and molding material, it is possible, by direct injection or injection of the color near to the respective mold openings, to bring about desired, colorized formulations, whereby the toothbrush body has no uniform, penetrating color, but exhibits a color pattern. The chromatic or optical appearance can be obtained through the input of several colors or by the addition of color varied in combination with other additives.

Besides colors, other additive materials, possibly in combinations, can also be added, after the injection unit with respect to the direction of the flow to the molding material within the transport distribution system to the molds. Again, this additive input to the molding material can be done directly at the mold entry openings. Advantageously, additives are available as colors, preferably liquid colors, powders, metal platelets, reinforcing or supportive material, deformation preventatives, chemically active additives, such as, for instance, a propelling agent, hardening material, softener, or the like.

Metal platelets can provide a scintillating effect whereby the injection molded product can be varied in its visible appearance, possibly in connection with different colors. As a reinforcing or supporting substance, fiber material. such as glass fibers or carbon fibers can be used, and besides these crushed stone, talcum, or the like can be employed. Aids for extraction of products from molds serve for a better protection for the items made by injection molding, for instance, silicone can be used for this purpose.

Chemically active additives can be employed for the altering of the properties of the injection material, for instance, to have a desirable effect on the consistency of the material to be molded. Such an additive can also be an activator, which would accelerate the solidification of the molded material. A softener can be added, especially when parts of a toothbrush body are to be provided with an enveloping spray of a rubbery elastic material. An accelerator means would be used, if the injected material comprised two substances.

In this way, besides reducing time and costs, further advantages emerge from a change in production from one design to another of injected molded articles and to expanded applications of the items.

The above named or comparable additives, in accordance with the inventive process, permit themselves to be added generally in close proximity to the mold cavities, since they become practically immediately effective. Due to this, making the addition in the supply container for the molding material which entails a long transport path to the mold cavities, or molds, becomes superfluous.

In a plurality of mold cavities provided in molding dies, these may be connected group-wise by a main channel distributor, or several channel subdistributors to the delivery system for the material to be injected. In this case, the possibility arises, in one embodiment of the invention, that the additive material at least can be supplied in its own channel distribution and subdistribution system.

If color, in the form of an additive, is input in a main distributor line, then all connected cavities of the molding dies are thus supplied with uniformly colored injection material. Upon the feed of the color into one or more subdistributors, then it is possible, even within the molding plate, to manufacture group-wise, differently colored toothbrush bodies.

Further the possibility exists, of inserting the additive directly into one or more nozzles, which nozzles are connected to the mold cavity. In this case, in proportion to the number of the available mold cavities, or groups thereof, and dependent upon the number of the desired colors, color changes are seldom necessary, except at considerably extended time periods, and indeed, under certain circumstances, no color change operation may be again necessary. In this way, the problems connected with color change operations do not occur again, or are substantially reduced in scope.

In accordance with a further development of the invention, the additive is given to the injection material in dosages. By the addition of differing additive quantities, the mixing proportions, especially where color (for instance, white material) is concerned, can be varied. Furthermore, by this method, within a given color, different hues can be achieved. The dosage can be carried out by periodic variation of the additive input and/or by changing the pressure of the additive delivery pressure.

The invention further relates to an injection molding machine for carrying out the inventive process. This injection molding machine includes an injection molding die, or dies, which contains an injection mold. The machine also includes an injection unit, in particular with a screw-piston extruder, or similar means of material transport. The function of the extruder is to transport the material to be molded from the injection unit to the distribution or feed channels which lead to the mold cavities. This injection molding machine is characterized, in that at one or more of the distribution channels are connected to one or more feeds for at least one additive. The machine is further characterized in that a respective distribution channel furnished with an additive feed, includes at least one mixing apparatus located, after (with respect to the direction of material flow) its point of connection to the additive feed.

The advantages essentially achieved with this injection molding machine have already been outlined in connection with the advantages of the above described process. Especially, by the measures available with the inventive injection molding machine, changeovers, for instance color alterations, can be carried out for different embodiments of the injection molded items with essentially less expense and in less time. In the case of injection molding dies containing several groups of mold cavities, as is customary in the manufacture of small brush bodies, especially toothbrush bodies, it is possible that simultaneously, different, especially toothbrush bodies of varied colors, can be produced.

Further, in a molding die where a multiplicity of mold cavities or groups of mold cavities are present, corresponding to the optional colors or embodiments of the brush bodies, a changeover of said injection molding machine, in the customary concept, becomes superfluous. In addition to this, the characteristics of the injection molded items can be altered by various additives and/or the manufacture improved, in fact, made less complicated. The mixing apparatus serves for a through mixing of the additive material into the basic material to be molded. Also, a good mix can be achieved by means of mixing at the feed point of the additive material close to the mold cavity. Such a mixing chamber has the advantage, that simple construction therefor is available and with no disturbing downtime.

A simple embodiment of a mixing apparatus can be provided by a change in the cross-section of a channel, preferably by a mixing chamber formed by an enlargement of the cross-section. Such a mixing chamber has the advantage, that a simple construction is employed and no disturbances can be attributed to the device.

In order to additionally improve the thorough mixing of additive and injection material, the entry point of the additive feed at the combined feed channel can be designed as an annular type nozzle. By this means, the additive material penetrates the injection material through a multiplicity of perforations, spaced at circumferentially apportioned distances about the additive line termination, thus enabling an intensive mixing at this location. Especially in a combination of one or more successive mixing apparatuses, or, for instance, a mixing chamber, it is possible to obtain a good, intimate mixing of additive and injection material.

Another advantageous embodiment is so designed that provision is made for a hot distribution channel system for the handling of melted injection material (hereinafter "melt"), the melt, before it is introduced into the mold cavity, is mixed with at least one additive, the distribution system includes at least one melt channel in which at least one feed line section for the entry of additive material opens, provision is made for at least one mixer connected in the direction of material flow, and the mixer is designed as a mixing assembly, which incorporates at least two mixer element sections, the axes of which are not in common alignment.

The advantage of this embodiment, wherein the design of the mixer is as at least a two-part unit and not as a single straight-line mixing section, lies in that it is now possible to have an extremely flexible, arrangement of the mixer which adapts itself to the geometry of the hot distribution channel.

The design of the hot channel distributor as a main distributor brings with it the advantage, that different sub-distributors connected to the main distributor can be supplied with melt which is mixed with various additives. For this purpose, a line for one or more additives, which connects into a length of the injection material feed line, and also a mixer in the direction of material flow, are both placed behind a branching leading to one or more subdistributors. In this manner, single subdistributors or groups thereof can be supplied with some flexibility to body melts which are mixed with various additives.

An even more flexible supply method is possible, if the hot distributor is designed as a subdistributor connected with several hot runner nozzles. With the aid of such a hot channel distributor, individual groups of hot runner nozzles can advantageously be supplied with melts, which melts are already mixed with various additive materials. If more mixers are employed then, advantageously, the length and the cross section of the single mixing stretches are equal. By this means, a balanced flow relationship is achieved, which, in turn, results in a uniform filling and subsequent repressure for each mold cavity.

In a further advantageous embodiment of the invention, the exit opening of a first section is connected in the direction of the material flow to the intake opening of a second section of the two mixing sections by means of a turn-around fitting. By this configuration, the goal is attained, that the first section provides a flowing material passage in one direction, which is essentially opposite to the flow direction in the second section. The turn around fitting, in this embodiment, allows the non-straight through configuration of the two sections to be realized. By an appropriate angular choice of the turn-around fitting, both sections accommodate themselves to the shape of the distributor and other components present, such as heating wires, or shutoff valves of the hot runner nozzles can be given consideration of proper placement. If the reverse flow angle of the fitting is 180°; then the length of the mixing section is halved by a loop, so that both channels of the mixing sections are disposed parallel to one another. In this way, an extremely compact hot distributing channel can be designed, which provides a mixer of high capacity, demanding a minimum of space. In another advantageous embodiment, the hot distributor channel can be constructed, using two horizontal planes located one above the other, whereby the first section is found in the lower and first plane and the second section is located in the upper and second plane. This symmetrical arrangement of the two parallel sectional lengths aids in the formation of a balanced channel layout, with equally long flow paths.

The hot distributor channel can be seen as divided by the two planes, into lower, middle and upper layers, whereby in each layer, grooves are provided and after the soldering of the said layers by vacuum diffusion process, the grooves of respectively matching layers, now form the upper and lower halves of a melt channel.

Experience has shown it to be of advantage, if the two mix sections are designed as two static mixers, which can effect a high degree of mixing of the melt in a minimum of space. Such static mixers are known from the catalog of *Mixing & Reaction Technology* (1994) of Sulzer Chemtech, GmbH specifically for installation in injection molding machines. These known mixers, however, should only complete the homogenization of the melt with color(s) in addition to a mixing of said melt by the action of an extruder.

In order the simplify the installation of the static mixer in the hot channel distributor, advantageously, the two static mixer elements can be soldered directly into the melt channel. For this purpose, prior to the soldering of the individual layers, each of the static mixing elements is inserted in one of the melt channel halves, which said half is found in each of the above described layers.

Preferred static mixer elements encompass respectively, a plurality of screw-shaped, twisted deflection plates, which, in alternate fashion, are arranged sequentially in a left and right sense. Each deflection plate includes two standing edges, perpendicular to the direction of flow, which, respectively, are bound to the adjacent edge of the neighboring deflection plate and are turned, in relation to the neighboring deflection plate, at a specified angle. Such static mixer elements divide the melt and mix non-homogenous streams again with each other. A particularly good dividing effect and mixing action is achieved, when the edges bound to one another are turned to an angle of 90° with each other. The adjacent edges of neighboring deflection plates can be connected by spot welding to one another.

In a section of a hot feed channel, an end piece of the additive feed can project into and coaxial with the melt channel, whereby an annular opening between the outer wall of the said end piece and the inner wall of the melt channel is formed for the flow of the melt. This advantage allows that the additive be guided into the center stream of the melt flow, which is a favorable situation for the desired uniform mixing of the melt with the additive. The diameter of the end piece of the additive channel can be less than the diameter of that part of the additive channel onto which the said end piece has been attached. This has the favorable effect, that the melt is fortunately hindered from entering into the additive end piece. The additive channel can be connected to a reservoir and a positive pressure pump. The pump impels the additive to be mixed from the reservoir into the end piece of the additive line with an appropriate pressure. The placement of the reservoir and the high pressure pump outside of the hot distributor channel enables a simple maintenance operation as well as a quick and simple additive material switch. Advantageously, the pressure achievable by the high pressure additive pump has a proper relationship to the existing pressure in the melt channel for the injection nozzle.

The end piece of the additive feed can be closed for metered dosage of the additive material by a needle valve, which, by means of a solenoid or magnetic valve is controllable for intermittent operation. With the aid of the needle valve and of the solenoid, a finely tuned dosage of the additive is possible.

It has shown itself as advantageous, if the solenoid of the needle valve is activated at a frequency of 30 to 100 cycles per second and the thrust of the needle valve is limited to 0.1 to 0.01 mm.

BRIEF DESCRIPTION OF THE DRAWINGS

Additional formulations and embodiments of the invention are made evident in the dependent claims. In the following, the invention, along with its essential particulars, is described in more detail with the aid of the drawings here listed. Schematically shown are:

DETAILED DESCRIPTION OF THE PREFERRED EMBODIMENTS

Figure 1:
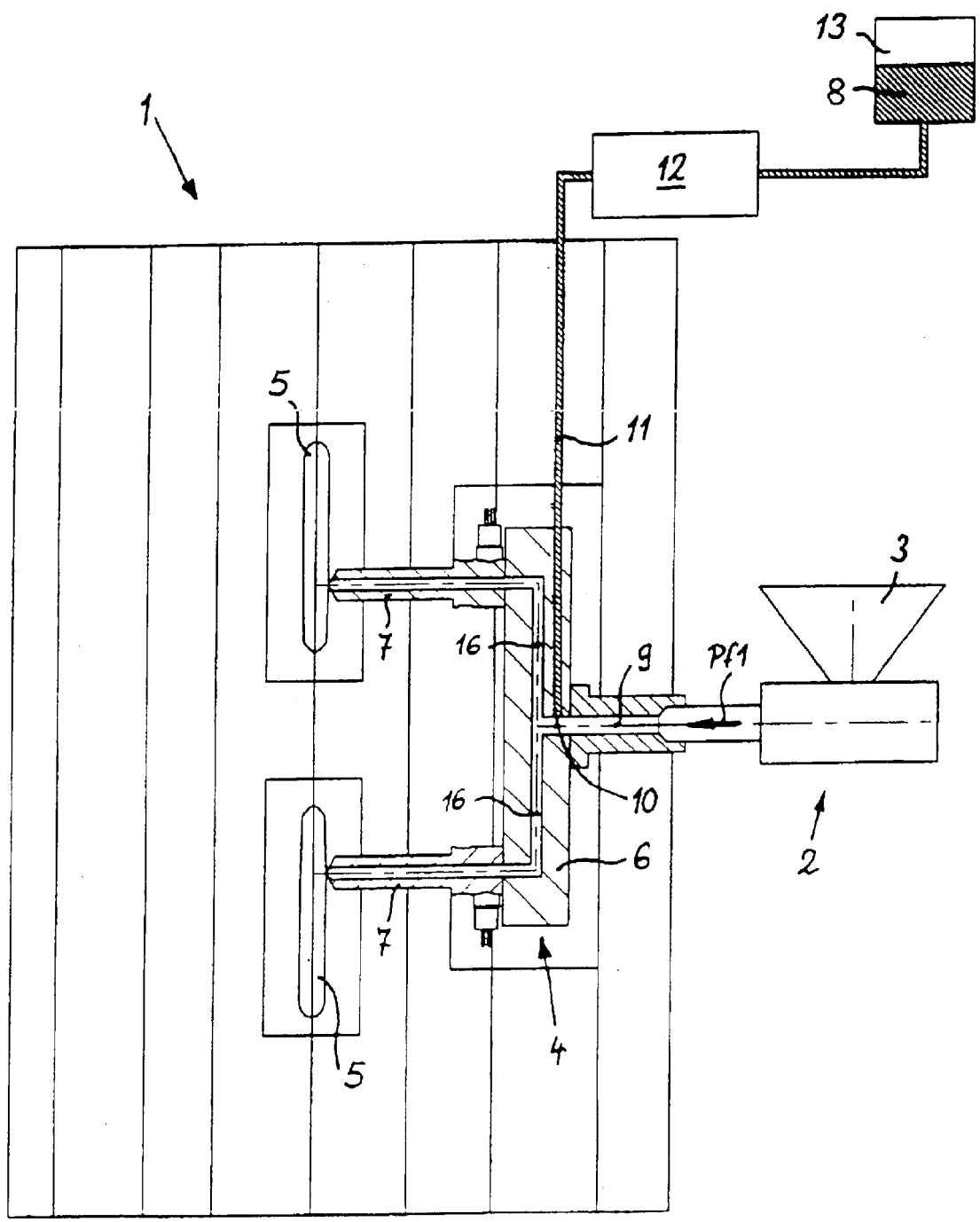
FIG. 1 is a sectional side view of an injection molding plate with an injection unit.

In the injection molding machine depicted in FIG. 1, the injection mold die 1 with the attached injection unit 2 can be seen. With the aid of the injection unit 2, which advantageously includes a materials transport apparatus in the form of a screw-piston extruder, as well as a feed arrangement with hopper 3 for the material to be molded, liquified injection material is transported by means of a distribution channel system 4 to the mold cavities 5. The described feed is carried out in the present case, according to FIG. 1, by a main distributor 6, which guides the material to the nozzles 7 at the individual mold cavities 5. Normally, for the manufacture of toothbrush bodies, hot channel plates are provided, wherein the injection material is retained in the feed and distribution channels at its injection temperature. Even the nozzles 7 are designed as so-called hot runner nozzles and are provided with means of heating.

In the case of the embodiment examples shown in the figures, additive material will be considered to be color 8 and in the further course of the description of the embodiment, the explanation will take this as a base of the said additive material, although other additives exist for the various versions of the brushes or the brush handles, as has already been discussed in the introductory paragraphs. In the embodiment as shown in FIG. 1, the color 8 is introduced inside the main distributor 6, by means of which, the injection material coming from the injection unit 2 for the production of colored toothbrush bodies will be colored. The color feed is done here within the main distributor 6 and thus the coloration proceeds through the main feed line 9 to the individual nozzles 7. The injection material conveyed from the injection unit 2 in the direction of the arrow Pfl mixes itself with the entering color from the color feed 10 of the main feed line 9, whereby in the additional travel distance to the entry openings of the molds, a sufficient mixing of the injection material takes place. Of essential interest in this case, is that the color is not immediately added in the area of the injection unit 2, so that, in case of a necessary change of color, only the colored injection material in the connecting channel length downstream and behind the color feed is retained, which, upon the change of color must be purged by continuous injection molding. Since the feed of color is carried out first in the main feed channel 9, on this account, the channel volume to be purged is substantially reduced. The color feed 10, which opens into one of the channels of a distributor arrangement 4, 4a, encompasses a feed line 11, a pump 12 as well as a supply tank 13 for the color 8. The pump 12 is advantageously designed both as a transport and dosage metering pump, so that specified quantities of color can be mixed with the injection material.

At the delivery opening of the color feed 10 into a channel of the distribution arrangement 4, for instance, into the main feed channel 9, a shutoff valve 15 (refer to FIG. 4) or similar device is provided, so that the feed of color, when required, can be blocked. This could be the situation during the post-pressure phase. For instance, a one way, non-return valve could be provided, which, closes color entry upon sensing a higher pressure in the distribution channel arrangement than at the color feed 10. The shutoff valve or the like can also be designed as a dosage valve, by means of which a dosed input of color is possible. Besides a continual dosaging, the color can also be injected intermittently, so that the toothbrush body can be produced with a specified color pattern.

Mention should also be made, that the color is to be delivered at about the same temperature as the injection material, so that opposing, unfavorable properties of the two materials are avoided. For this purpose, a separate temperature apparatus for the color can be provided, or, as another possibility, the heating apparatus for the hot channel feed is also simultaneously coopted to bring the color to the required temperature.

Figure 2:
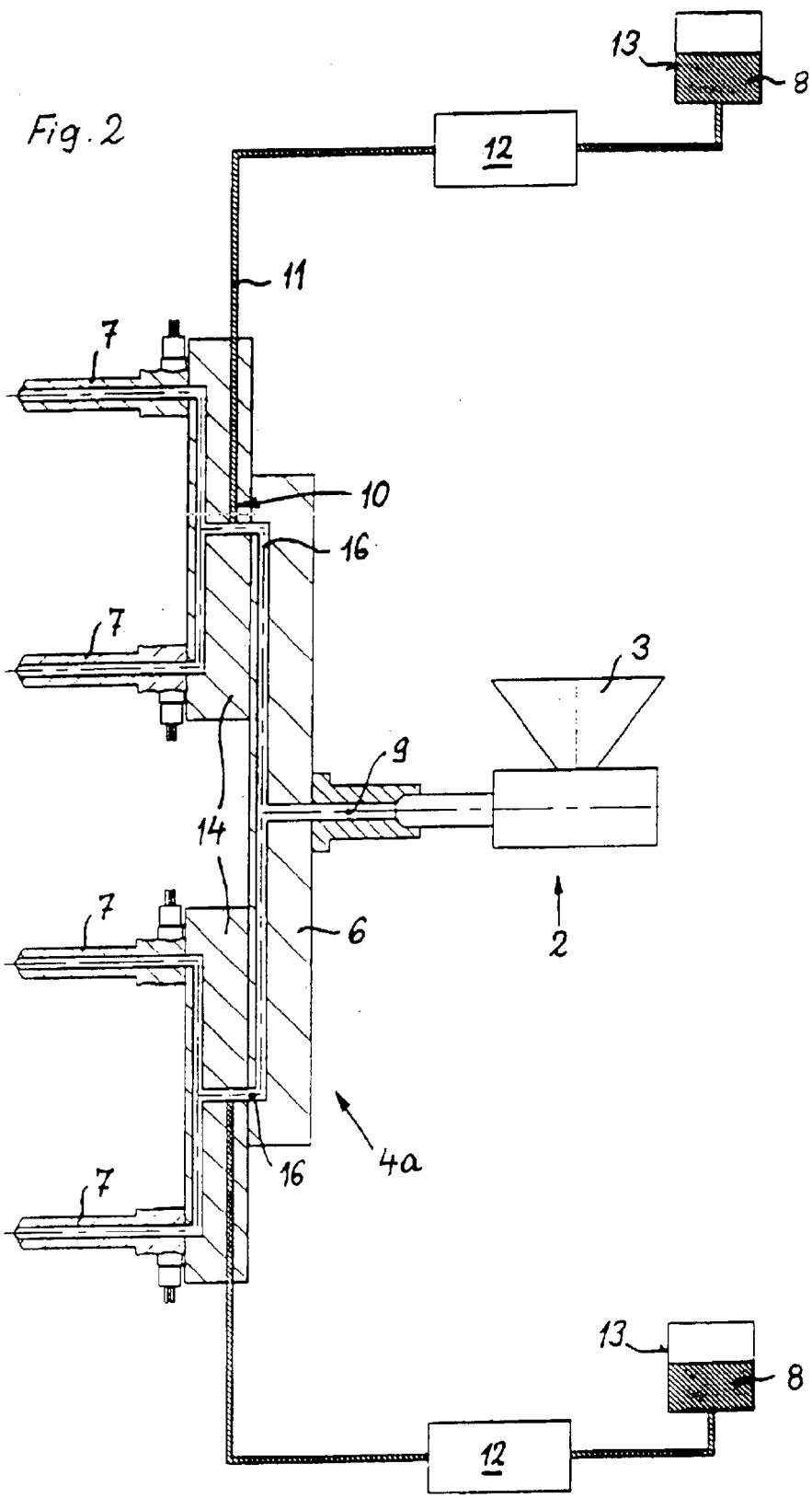
FIG. 2 is a sectional side view of an injection unit with a connected distribution arrangement and additive feed lines connected to subdistributing channels.

FIG. 2 shows a distribution channel arrangement 4a in which the main distributor 6 is connected to subdistributor 14. In FIG. 2, two subdistributors 14 are joined to the main distributor 6. However, it is still possible that even more subdistributors can be installed in planes parallel to the plane of the drawing. An instance of this would be where four parallel planes exist with respectively two subdistributors by means of which sixteen mold openings 5 would be served. As is made clear in FIG. 2, the color input feed point 10 in this embodiment is a connection to each subdistributor 14 of the channel 16 issuing from the main distributor 6. This configuration permits two toothbrush bodies of the same color to be injection molded at the same time. In an embodiment with a total of sixteen mold cavities, this would mean that simultaneously, per mold shot, 16 toothbrush bodies with eight different colors could be produced.

Figure 4:
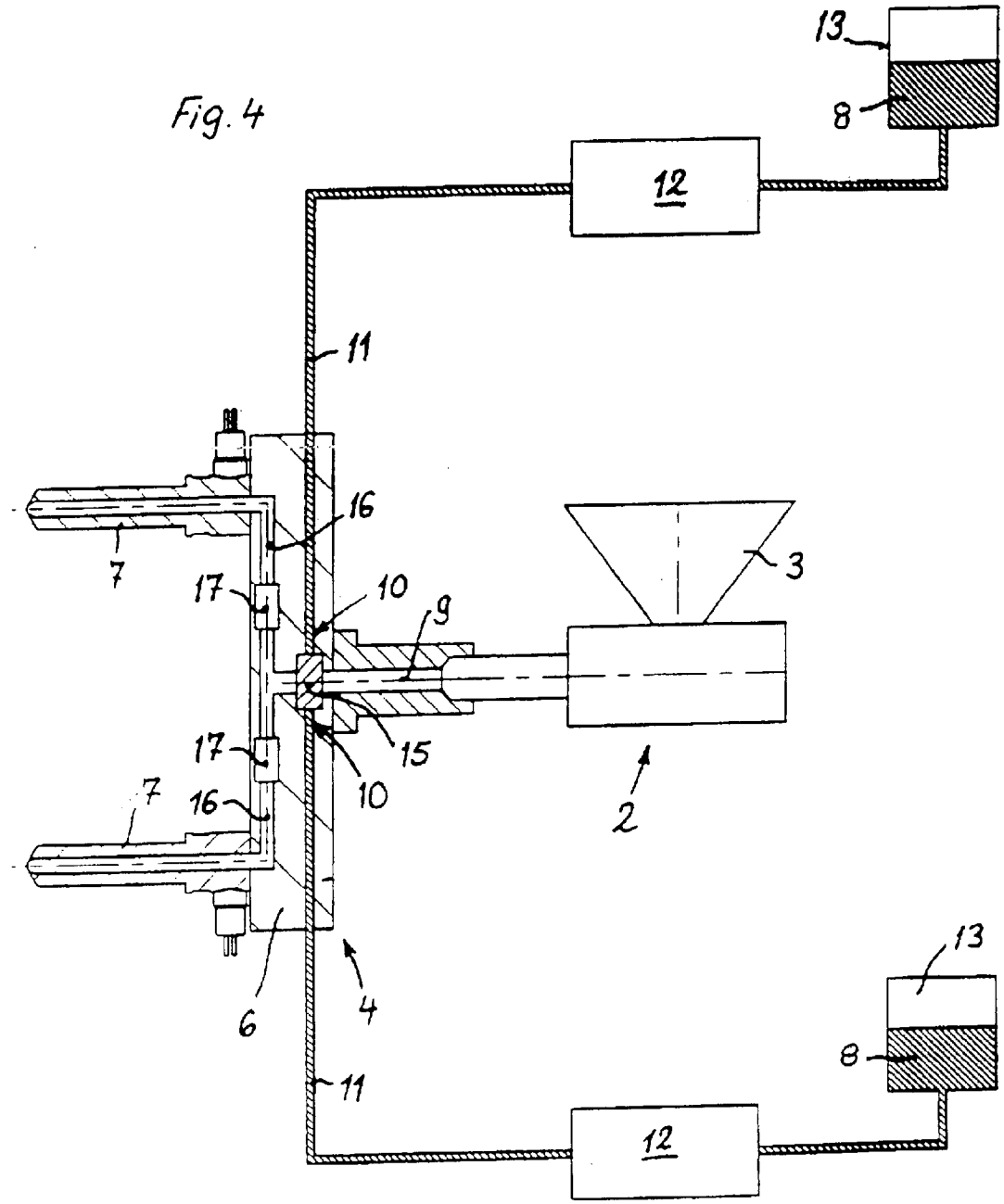
FIG. 4 is a view similar to FIG. 2 of a distribution channel arrangement with an additive feed connected to a principal distributor.

In FIG. 4, the color feed lines to the distribution channel arrangement 4 at the main distributor 6 is carried out at the same location as shown in FIG. 1, i.e., in the main feed channel 9. In this case, however, two color feeds 10 are provided, with which, alternately, different colors can be bled into the mix. For this purpose, the delivery openings of the color feed 10 can be opened or closed with the aid of a toggle shutoff valve 15. For an intensive color mixing, is becomes necessary, especially when the color feed 10 is in proximity to the mold inlet opening 5, to provide one or more mixing stations in the feed path.

FIG. 4 also shows mixing chambers 17 located in subordinate channels 16 branching from the main feed channel 9. These mixing chambers 17 are formed by an expansion in the cross-section of the respective branch of channel 16. Such cross-section expansions lead to a condition, in which the injection material flowing through is vortexed and thus better mixed with the therewith infused coloring material. Instead of this especially simple, but effective mixing apparatus, other means of mixing can be provided, for instance a gear pump, possibly without a drive mechanism, or the like.

As a further measure for a thorough mixing of injection material and the added color, the entrance of the color feed 10, at the distribution channel or the main feed line, can be designed as an annular nozzle. Such an annular nozzle can exhibit a multiplicity of outlet openings on its circumference, so that the color, upon its addition, immediately apportions itself into the cross-section of the injection material, so that, in the shortest path, a thorough mixture is immediately obtained.

Figure 6:
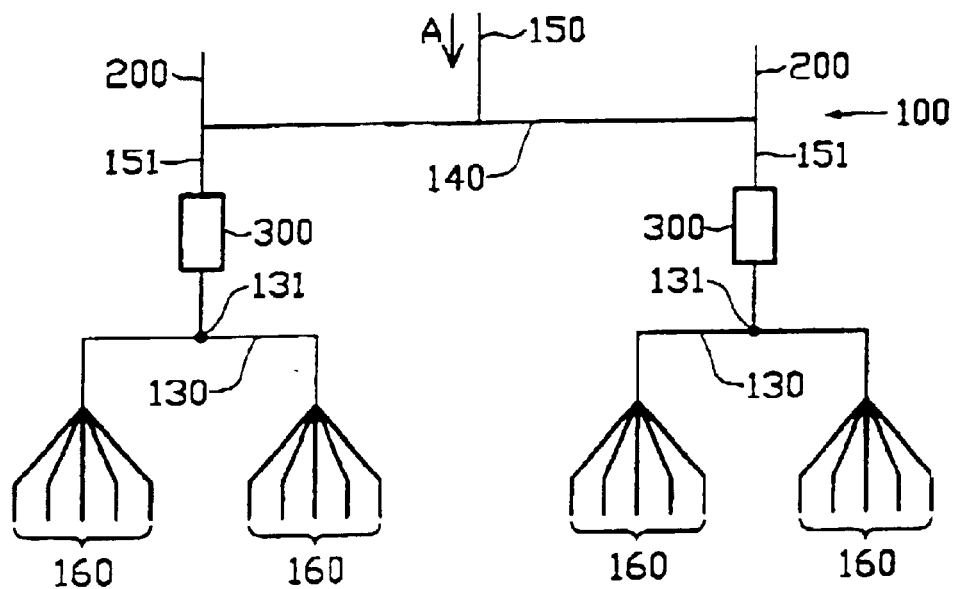
FIG. 6 is a schematic view of a hot channel system comprised of a main distributor channel and two subdistributor channels, which are respectively connected to two groups of five hot runner nozzles, wherein the main distributor is designed as a hot channel distributor in accordance with the invention.

FIG. 6, 7 show a melt channel 150 that divides into two branches entering a main distributor 140, each branch eventually reaching another bifurcation into a respective subdistributor 130, to produce thereby, respectively again, two groups 160 of five hot runner nozzles. In the arrangement of FIG. 6, the said main distributor 140 becomes part of an inventive hot channel distributor arrangement 100. Into this hot distributor 100 enter two additive lines 200 forming two feed sections 151 which are continuations of hot distributor 150, and onto which respectively a mixer 300 is connected in the direction A of the material flow. The melt channel 150 leads through this said mixer 300 to respectively, a subdistributor 130, which, in turn, is connected to the mentioned five groups of hot runner nozzles 160. With this arrangement, it is possible that two subdistributors 130 can be supplied with melts 101, with which, in the main distributor 140, different colors 102 are mixed with the injection material.

Figure 7:
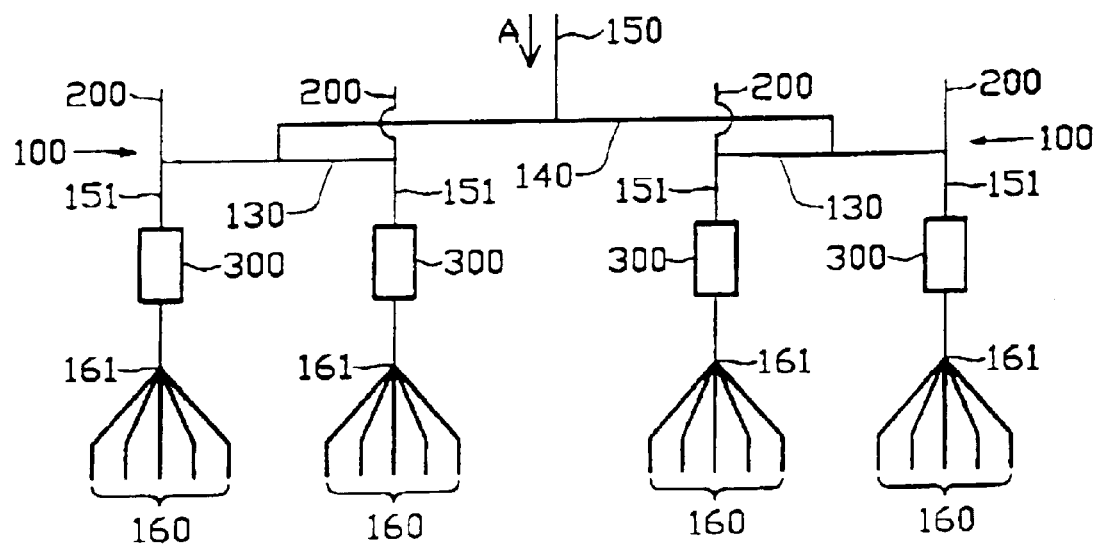
FIG. 7 is a hot channel system as shown in FIG. 6, wherein the two subdistributors are designed as hot channel distributors in accordance with the present invention.

A greater flexibility in the mixing of various colors 102, the colors here serving as an example of additives, can be achieved in that, as FIG. 7 shows, the subdistributor 130 also becomes part of inventive hot channel distributor 100. For this purpose, the feed delivery line sections 151, into which the additive lines 200 enter, deliver color to the mixer 300 directly before the branch 161 to the individual hot runner nozzles 160. In this way, each group of the hot runner nozzles 160 can be separately supplied with melt 101 which melt is mixed respectively in each case with another color 102, or the same additive.

In order that balanced flows may be maintained in all parts of the main distributor 140 or the subdistributor 130, it is of advantage, to install equivalent mixers. For instance, where mixers 300 are employed, the length of mixing and cross-sections thereof should be equal.

Figure 8:
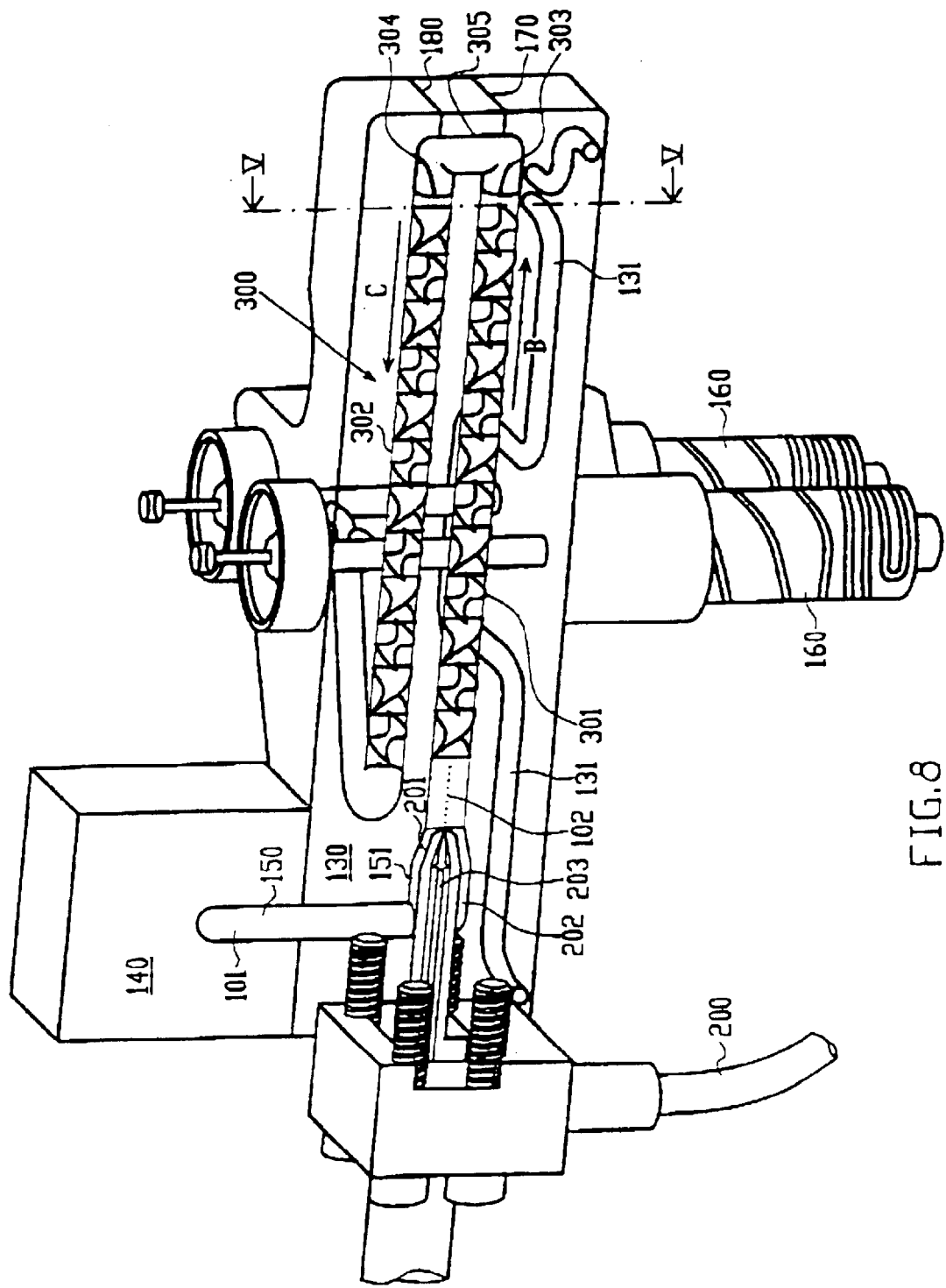
FIG. 8 is a cross-section through a subdistributor in accordance with the invention, in which a mixing section with two static mixers is provided.

For the following embodiment, a liquid coloring means 102 is chosen as the additive color. As FIG. 8 shows, a melt channel 150 leads out of the main distributor 140 into the subdistributor 130. In the feed area 151, an endpiece 201 of the additive line 200 discharges into the melt channel 150 An annular opening 202 is formed between the outer wall of said endpiece 201 and the inner wall of the melt channel 150. The melt 101 flows through this annular opening 202 along the endpiece 201. From an opening (not shown) at the tip of the endpiece 201, the color 102 is precisely dosed into the melt 101 with the aid of a needle valve 203. The color 102 is carried along as a thin thread in the center of the melt 101, until the melt 101 and the color 102 enter into the mixer 300. After passing through the mixer 300, the melt 101 and the color 102 are homogeneously mixed and are conducted to the hot runner nozzles 160, which inject the melt 102 with its mixed in color 101 into the plate containing the mold cavities 5.

In the embodiment shown in FIG. 8, a mixer 300 is shown, which is designed as a mixing length, having two sections, respectively 301, 302. The axes of these two sections are in separate planes. In particular, the exit opening 303 of the first mixer section 301 connects with an intake opening of the second mixer section 302 by means of a 180° turn-around piece, or U-turn fitting, 305, of the melt channel 150. In this manner, the two section pieces 301 and 302 are made parallel to one another. The melt mixture flows through the first section 301 in the direction of arrow B, while the second section 302 carries the flow of melt mixture in the arrow direction C. The through-flow directions B and C of the two section lengths 301 and 302 are, as shown in FIG. 8, in opposite directions. The special arrangement of the two parallel section lengths 301 and 302, thus in planes 170, 180, one over the other, allows a symmetrical lead-in of the melt channel 150 to the two hot runner nozzles 160, as shown in FIG. 8. Also served by melt channel 150 are two other hot tube nozzles (not shown), which are located symmetrically to the said two hot runner nozzles 160 in the respective sectioning planes. In the embodiment presented in FIG. 8, the first section 301 is in the lower plane 170 and the second section 302 is in the upper plane 180 extending immediately above said lower plane. Converse consideration can be given to locate the first section 301 in the upper plane 180 and then to conduct the melt mixture through the second section 302 which lies in the lower plane 170. In this second possibility, the melt 101 with the color 102 would exit the second section 302 directly to the hot runner nozzles 160 similar to the presentation of FIG. 8.

Besides the illustrated embodiments of the invention as shown in FIG. 8, naturally other embodiments are possible, in which the two sections 301 and 302 are not in straight through alignment. For instance, the fitting 305 binding the two sections 301 and 302 to make a 180° turn of the melt channel 150 could be employed in such a way that it is twisted through a different angle. In this case, the two sections 301 and 302 do indeed lie respectively in the planes 170, 180, but cease to be parallel, and are disposed at a given angle to one another. This angle could be determined, for instance, to be in accord with the shape of the subdistributor 130, or be aligned to accommodate heating wiring.

Figure 9:
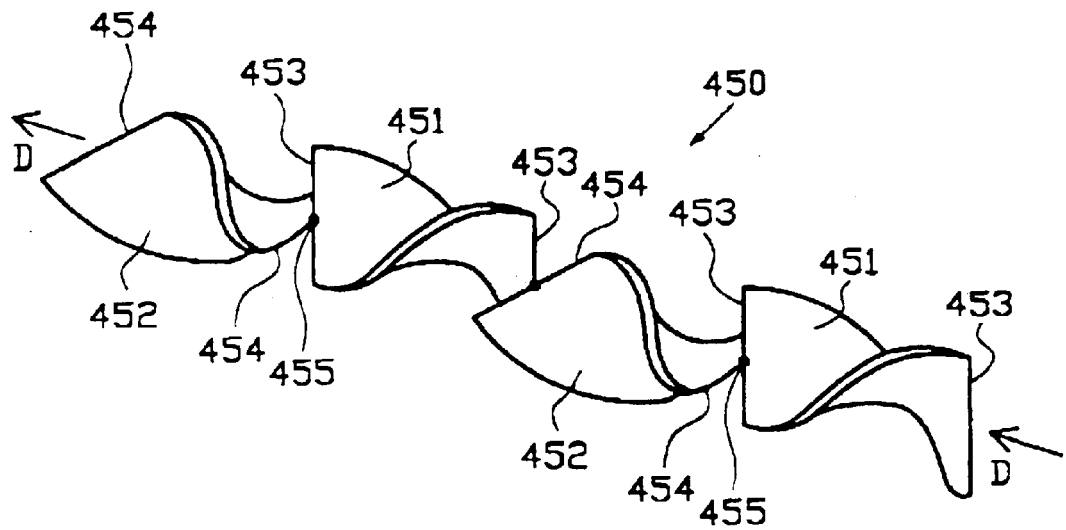
FIG. 9 is a perspective detail view of one of the two static mixer elements of FIG. 8.

From FIG. 8, it may be seen that the two sections 301 and 302 are designed as static mixers 450. The construction of the two static mixers 450, presented in FIG. 8 as mixer sections 300, is made evident in FIG. 9. FIG. 9 shows that such a static mixer as mixer 450 is composed of a plurality of screw shaped deflection plates 451 and 452. In all the construction, the alternate left and right oriented deflection plates 451 and 452 are placed sequentially, one behind the other. Each deflection plate 451 possesses two edges 453, standing at right angles to the flow direction D. These edges 453 are respectively joined to the edges 454 of the adjacent deflection plates 452, which likewise stand perpendicular to the direction of flow D. The edges 453 and 454 are turned, in respect to one another, a given angle. In this embodiment, the edges 453 and 454 are joined together at an angle approximating 90°, other angles of said edges are, of course, possible. The adjacent edges 453, 454 of the neighboring deflection plates 451,452 are connected to one another by spot welding at the binding point 455.

Figure 10:
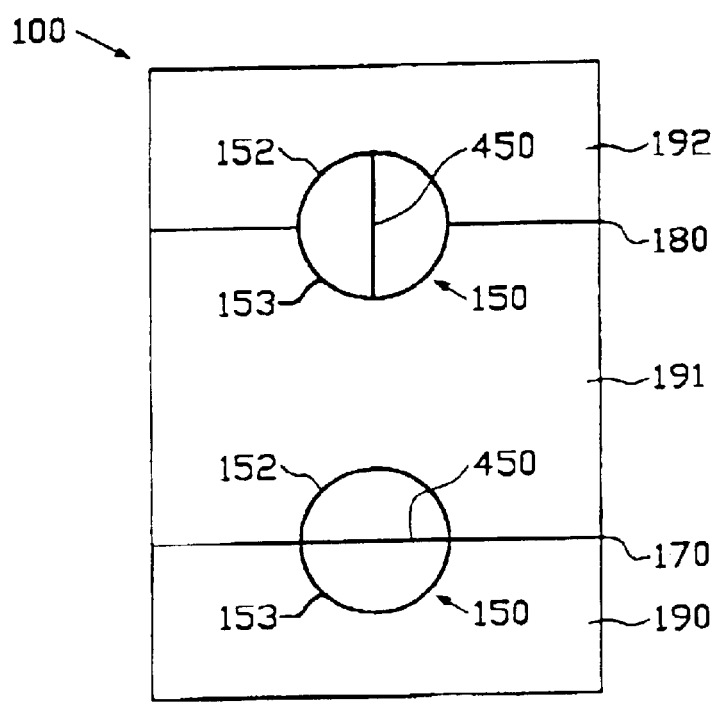
FIG. 10 is a section through the subdistributor of FIG. 8 taken along section line V—V.

In FIG. 10 it is illustrated that the two static mixers 450 are soldered directly in the melt channel 150, which is made possible by the multi-part construction of the hot channel distributors. This distributor is, as is shown in FIG. 10, divided along planes 170, 180 into a lower, a middle, and an upper layer, namely respectively 190, 191, 192. In each layer 190, 191, 192, grooves are provided, which, after the assembly of the layers 190, 191, 192, form the upper and lower halves 152, 153 of the melt channel 150. The binding together of the layers 190, 191, 192 is done by soldering with the aid of a vacuum diffusion process.

For the installation, the static mixer 450, is inserted in, respectively, a groove half 152 or 153 before the connection of the layers, 190, 191, 192. The soldering of the static mixer 450 is carried out simultaneously with the soldering of the individual layers 190, 191, 192.

Obviously, still more static mixers can be provided in parallel arrangement, or beside the illustrated static mixers 450 as these are shown in the FIGS. 8 and 10. The modular construction of the hot channel distributor 100, as well as the number of its layers, is dictated by the number of the employed static mixers with consideration given to the assembly principles given above.

Although, in this embodiment, only static mixer 450 with the deflection plates 451, 452 are presented, naturally, other static mixers, such as, for instance, static mixers with webs can be employed.

The dosing of the color 102 or a similar additive is done, as again may be further inferred from FIG. 8, with the aid of a needle valve 203, which closes and/or opens the endpiece 201. In this operation, the point of the needle valve 203, which is movable, is made to fit into a (not shown in FIG. 8) opening of the end piece 201. By means of the longitudinal movement of the needle valve 203, this opening can be closed or opened by the point of said needle valve. Since the high pressure pump in the additive line 200 maintains a permanent pressure of approximately 1000 bar to 1500 bar at the endpiece 201 of said additive line 200, upon the opening of the needle valve 203, a defined amount of the color 102 issues into the melt 101. For the dosaging of the color 102, the said needle valve 203 can be intermittently controlled by a solenoid 204. Together with a retraction spring (not shown) which either opens or closes the valve, the solenoid 204 activates the axial movement of the needle valve 203. The frequency range, in which the solenoid 204 operates, lies between 30 and 100 cycles/sec. The thrust, by which the needle valve 203 is displaced, is limited to 0.1 to 0.01 mm.

Figure 3:
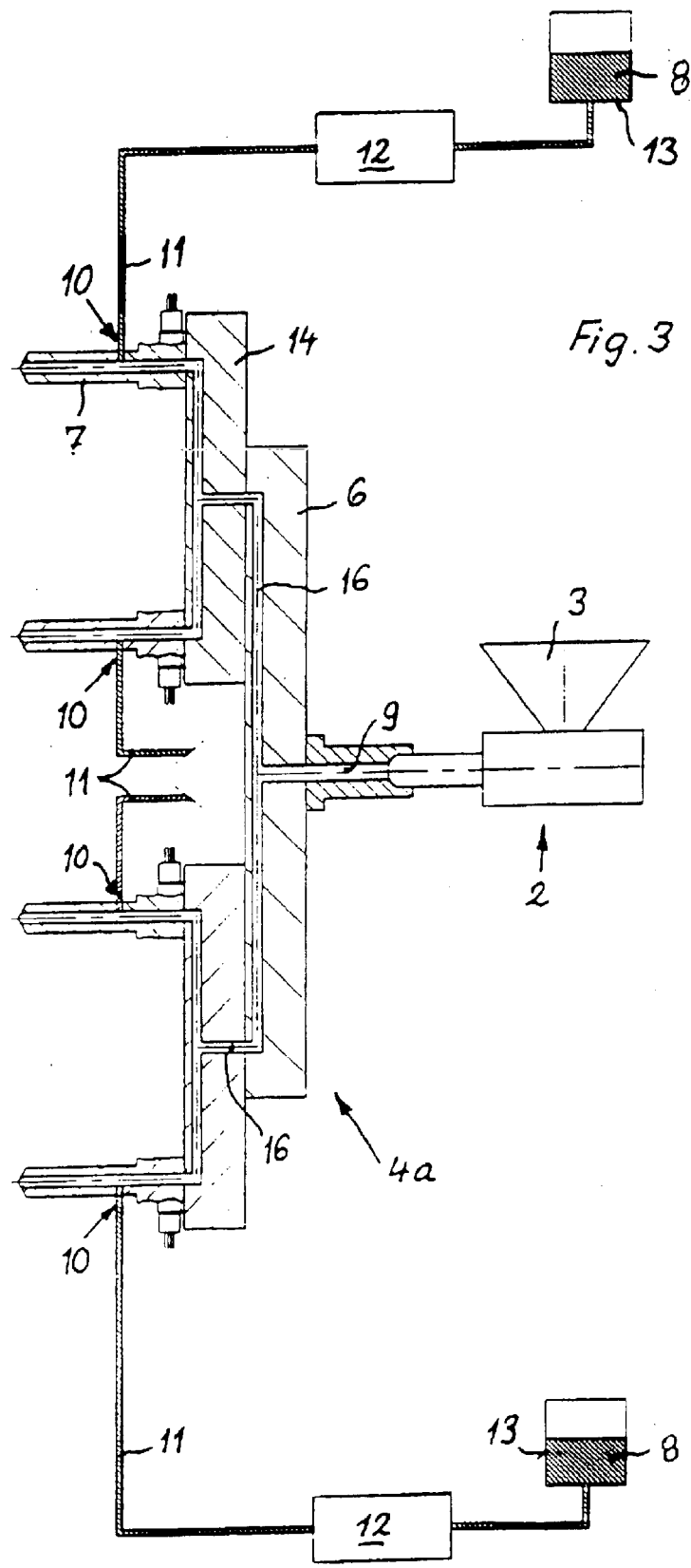
FIG. 3 is an arrangement similar to that shown in FIG. 2, but with additive feed lines connected to the nozzles.

FIG. 3 shows a distribution channel system 4a somewhat similar to FIG. 2, but in which case the additive material feeds 10 are now conducted to each hot runner nozzle 7. Thereby, each mold cavity 5 assigned to each individual nozzle 7 (see FIG. 1) can receive an injection, for example, of the chosen color of a toothbrush body. Also, in this to case, in the remaining path to the mold cavities 5, an additive as a measure for better mixing between the injection material and the color may be supplied, or the introduction of other additives.

Figure 5:
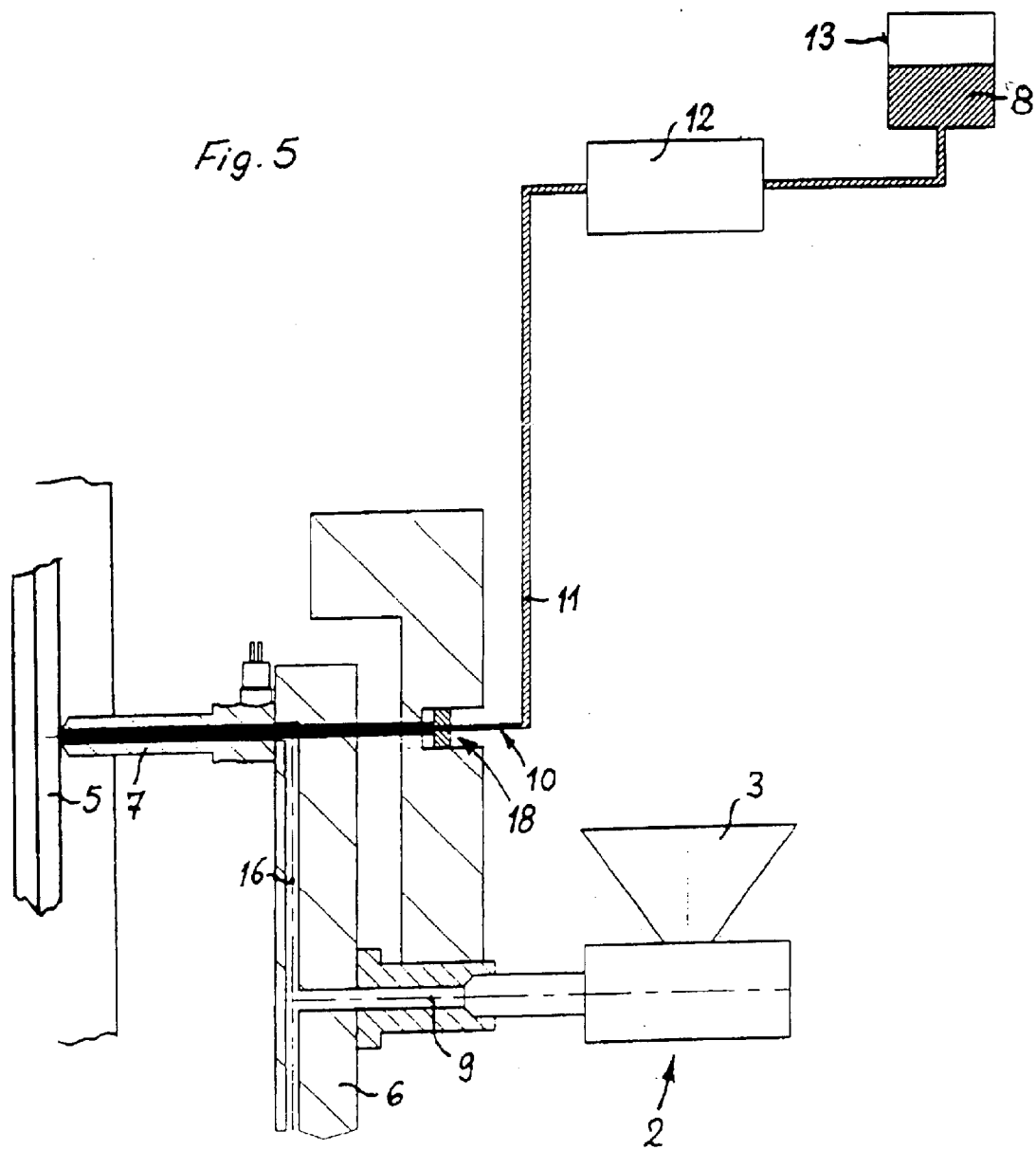
FIG. 5 is a sectional side view of a distribution channel with an additive feed in the entry area of a nozzle connected to a mold cavity.

In the case of the arrangement shown in FIG. 5, the feed of the additive material occurs at the end of the hot runner nozzle 7 proximal to the mold cavity 5. In this embodiment, the additive feed line proceeds coaxially inside the nozzle tube and it is here that a needle closure endpiece 18 is provided for the delivery of the additive. To be sure, in the case of direct additive deliver into the mold entry 5, no homogenous thorough mixing is possible. However, this system permits the toothbrush bodies to be especially colorfully formed, whereby mixtures of colors or zones of wavy configurations and the like can be provided. Toothbrush bodies with several color zones can be thus produced. Such coloration effects can also be realized by means of injection material using, for instance, color feed 10 proximal to the mold cavities 5 where the distance from the entrance of the color feed from the adjacent mold cavity 5 is made with consideration of the volume of the item to be molded and the foreseen range of the color thereof. Also, when this is done, in the case of intermittent feed of color, areas of color zones within a toothbrush body can be made.

Mention should further be made, that by means of the injection unit 2, added injection material itself can already exhibit a basic color, for instance white, so that with additive colors introduced, also combined colors can be achieved. Normally, where basic injection molding material is concerned, the rule is for colorless, mostly transparent substances.

What is claimed is:

1. An injection molding machine for the manufacture of injection molded articles, comprising:
   an injection molding die;
   an injection unit feeding a plurality of mold cavities;
   a heated distributor channel arrangement with distributor channels that carry injection material between the injection unit and said mold cavities;
   a mixing apparatus for the injection material; and
   an additive feed line, wherein the additive feed line is in the heated distributor channel arrangement,
   wherein the mixing apparatus is part of the distributor channels of the heated distributor channel arrangement and the additive feed line connected to a channel main distributor or a channel subdistributor connected to the injection unit or to a nozzle connected to the mold cavity.

2. An injection molding machine in accordance with claim 1, wherein the additive feed line is connected to the channel subdistributor or the channel main distributor.

3. An injection molding machine in accordance with claim 1, wherein the additive feed line can be closed.

4. An injection molding machine in accordance with claim 3, further comprises a shutoff valve which is designed as a dosage valve for the additive material.

5. An injection molding machine in accordance with claim 1, further comprises a plurality of additive feed lines, wherein at least one of the plurality of connections is connected directly to one of the mold cavities.

6. An injection molding machine in accordance with claim 1, wherein the mixing apparatus includes at least one mixing chamber formed by a cross-sectional change, preferably by a cross-sectional expansion.

7. An injection molding machine in accordance with claim 1, wherein the mixing apparatus includes at least one mixer aligned in a direction of flow, and wherein the mixer is formed as a mixing section which includes at least a first section and a second section, axes of which are not aligned to coincide with one another.

8. An injection molding machine in accordance with claim 7, wherein a channel main distributor is coupled to each of a plurality of channel subdistributors through a feed line of the additive feed line, wherein each channel subdistributor includes a corresponding mixer.

9. An injection molding machine in accordance with claim 7, wherein a channel main distributor is connected to a plurality of channel subdistributors and each channel subdistributor is connected to a corresponding additive feed line which flows into mixer which is placed in the direction of flow between the channel subdistributors and the hot runner nozzles.

10. An injection molding machine in accordance with claim 8, wherein the plurality of mixers are of equal length and cross-section for the attainment of balanced flow ratios.

11. An injection molding machine in accordance claim 7, wherein an exit opening of the first section of the mixer is connected to an entry opening of the second section of the mixer by a flow direction reversal fitting, wherein a first direction of flow in the first section is essentially opposite to a second direction of flow in the second section.

12. An injection molding machine in accordance with claim 11, wherein the exit opening of the first section is connected with the entry opening of the second section by means of a 180° turn-around fitting, whereby the two sections of the mixing length are made to be parallel to one another.

13. An injection molding machine in accordance with claim 12, wherein the distributor channels are constructed of at least two horizontal planes placed one upon the another, whereby the first section of the mixer is provided in the lower, first plane and the second section is provided in the upper, second plane.

14. An injection molding machine in accordance with claim 13, wherein the distributor channels are divided along the two planes into a lower layer, a middle layer and an upper layer, whereby grooves are provided in each layer, and whereby, after soldering of the layers by a vacuum diffusion process, the grooves of adjacent layers form, respectively, lower and upper halves of the distributor channels.

15. An injection molding machine in accordance with claim 7, wherein the first and the second sections are respectively provided as static mixers.

16. An injection molding machine in accordance with claim 15, wherein the two static mixers are soldered into the distributor channel.

17. An injection molding machine in accordance with one of claims 15 and 16, wherein the two static mixers comprise a plurality of screw shaped, twisting deflection plates which are arranged behind one another, wherein each deflection plate possesses two edges standing at right angles to the direction of flow, which are connected with the respective adjacent edge of the neighboring deflection plate, and a specified angle in relation to said adjacent edge.

18. An injection molding machine in accordance with claim 17, wherein the edges of the deflection plates are connected together at an angle of 90° from one another.

19. An injection molding machine in accordance with claim 17, wherein the adjacent edges of neighboring deflection plates are connected together by spot welding.

20. An injection molding machine in accordance with claim 7, wherein the the additive feed line includes an endpiece penetrating coaxially into the distributor channel, thereby forming an annular opening between an outer wall of the endpiece and an inner wall of the distributor channel to allow flow of melt.

21. An injection molding machine in accordance with claim 20, wherein a diameter of the endpiece of the additive feed line is smaller than a diameter of the part of the additive feed line which is connected to the endpiece.

22. An injection molding machine in accordance with claim 20, wherein the additive feed line is connected to a reservoir and a high pressure pump, which pumps the additive material to be mixed out of the reservoir into the endpiece of the additive feed line and further into the distributor channel at a sufficiently high pressure.

23. An injection molding machine in accordance with claim 22, wherein the pressure generated by the high pressure pump is at least as high as the pressure force in the distributor channel at the injection point.

24. An injection molding machine in accordance with claim 23, wherein the pressure generated by the high pressure pump is between 1000 bar and 1500 bar.

25. An injection molding machine in accordance with claim 22, wherein the endpiece of the additive feed line can be closed by a needle valve for the dosing of the additive, and the needle valve is intermittently controllable.

26. An injection molding machine in accordance with claim 25, wherein a solenoid activates the needle valve at a frequency of 30 to 100 cycles per second.

27. An injection molding machine in accordance with claim 25, wherein the needle valve travel is limited to 0.1 to 0.01 mm.

28. An injection molding machine in accordance with claim 1, wherein a plurality of additive feed lines are provided in a channel leading to the mold cavities in the direction of flow, and wherein the additive feed lines can be optionally closed.

29. An injection molding machine in accordance with claim 1, wherein an entry of the additive feed line at the distributor channel is designed as an annular opening.

30. An injection molding machine in accordance with claim 1, further comprising a material propelling means, coupled to the additive feed line, and an additive storage containers.

31. An injection molding machine in accordance with claim 1, wherein the additive includes at least one of the following: color granulates, powder, metal platelets, protective material, reinforcing material, mold release means, chemically active additives hardeners, and softeners.

32. An injection molding machine in accordance with claim 1, wherein the mixing apparatus comprises a first layer with a half of a distributor channel section and a second layer with another half of the distributor channel, and the mixer apparatus includes a mixer located between the first and second layers and the first and second layers are connected together.

* * * * *

UNITED STATES PATENT AND TRADEMARK OFFICE
CERTIFICATE OF CORRECTION

PATENT NO. : 6,776,600 B1
DATED : August 17, 2004
INVENTOR(S) : Zahoransky et al.

It is certified that error appears in the above-identified patent and that said Letters Patent is hereby corrected as shown below:

Column 12,
Line 48, insert -- is -- after "line".
Line 61, delete "comprises" and insert -- comprising -- therefor.

Column 14,
Line 49, delete "containers" and insert -- container -- therefor.

Signed and Sealed this

First Day of November, 2005

JON W. DUDAS
*Director of the United States Patent and Trademark Office*